(12) United States Patent
Okuyama et al.

(10) Patent No.: US 11,181,784 B2
(45) Date of Patent: Nov. 23, 2021

(54) DISPLAY DEVICE

(71) Applicant: Japan Display Inc., Minato-ku (JP)

(72) Inventors: Kentaro Okuyama, Tokyo (JP); Hiroki Sugiyama, Tokyo (JP); Yoshihide Ohue, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/829,113

(22) Filed: Mar. 25, 2020

(65) Prior Publication Data
US 2020/0310175 A1 Oct. 1, 2020

(30) Foreign Application Priority Data

Mar. 27, 2019 (JP) .............................. JP2019-060677

(51) Int. Cl.
*G02F 1/1339* (2006.01)
*G02F 1/1334* (2006.01)

(52) U.S. Cl.
CPC .......... *G02F 1/1339* (2013.01); *G02F 1/1334* (2013.01)

(58) Field of Classification Search
None
See application file for complete search history.

(56) References Cited

U.S. PATENT DOCUMENTS

| | | | | |
|---|---|---|---|---|
| 4,647,156 | A | * 3/1987 | Fujimura | G02F 1/1339 349/153 |
| 2002/0047963 | A1 | * 4/2002 | Youn | G02F 1/133512 349/110 |
| 2006/0216434 | A1 | * 9/2006 | Okuyama | C09K 19/544 428/1.1 |
| 2010/0045920 | A1 | * 2/2010 | Kwak | G02F 1/1339 349/153 |
| 2014/0300845 | A1 | * 10/2014 | Tamaki | G02F 1/133512 349/65 |
| 2015/0153596 | A1 | * 6/2015 | Senokuchi | G02F 1/133308 349/58 |
| 2017/0261809 | A1 | 9/2017 | Mizuno et al. | |
| 2018/0211630 | A1 | * 7/2018 | Kato | G09G 3/3611 |

FOREIGN PATENT DOCUMENTS

| | | |
|---|---|---|
| JP | 2016-167527 A | 9/2016 |
| JP | 2017-167214 A | 9/2017 |

* cited by examiner

*Primary Examiner* — Edward J Glick
*Assistant Examiner* — David Y Chung
(74) *Attorney, Agent, or Firm* — Oblon, McClelland, Maier & Neustadt, L.L.P.

(57) ABSTRACT

According to one embodiment, a display device including a first substrate having a first end portion, a second substrate facing the first substrate and having a second end portion separated from the first end portion, a liquid crystal layer located between the first substrate and the second substrate, a light-emitting element facing the second end portion, a first sealing member bonding the first substrate and the second substrate together, and a low refractive area located between the first substrate and the second substrate, located between the second end portion and the first sealing member in planar view, and containing a material having a refractive index lower than that of the second substrate.

5 Claims, 14 Drawing Sheets

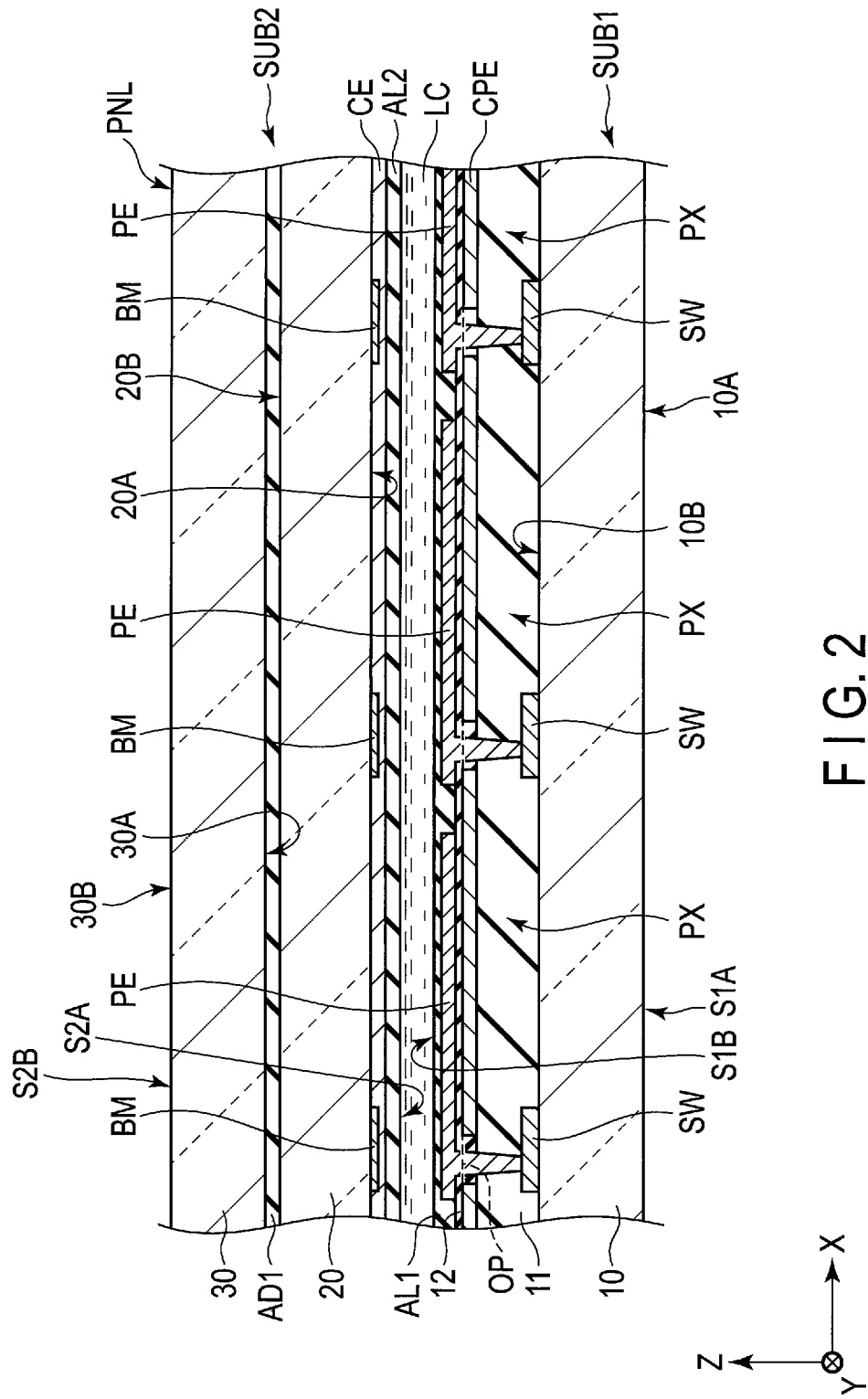
F I G. 2

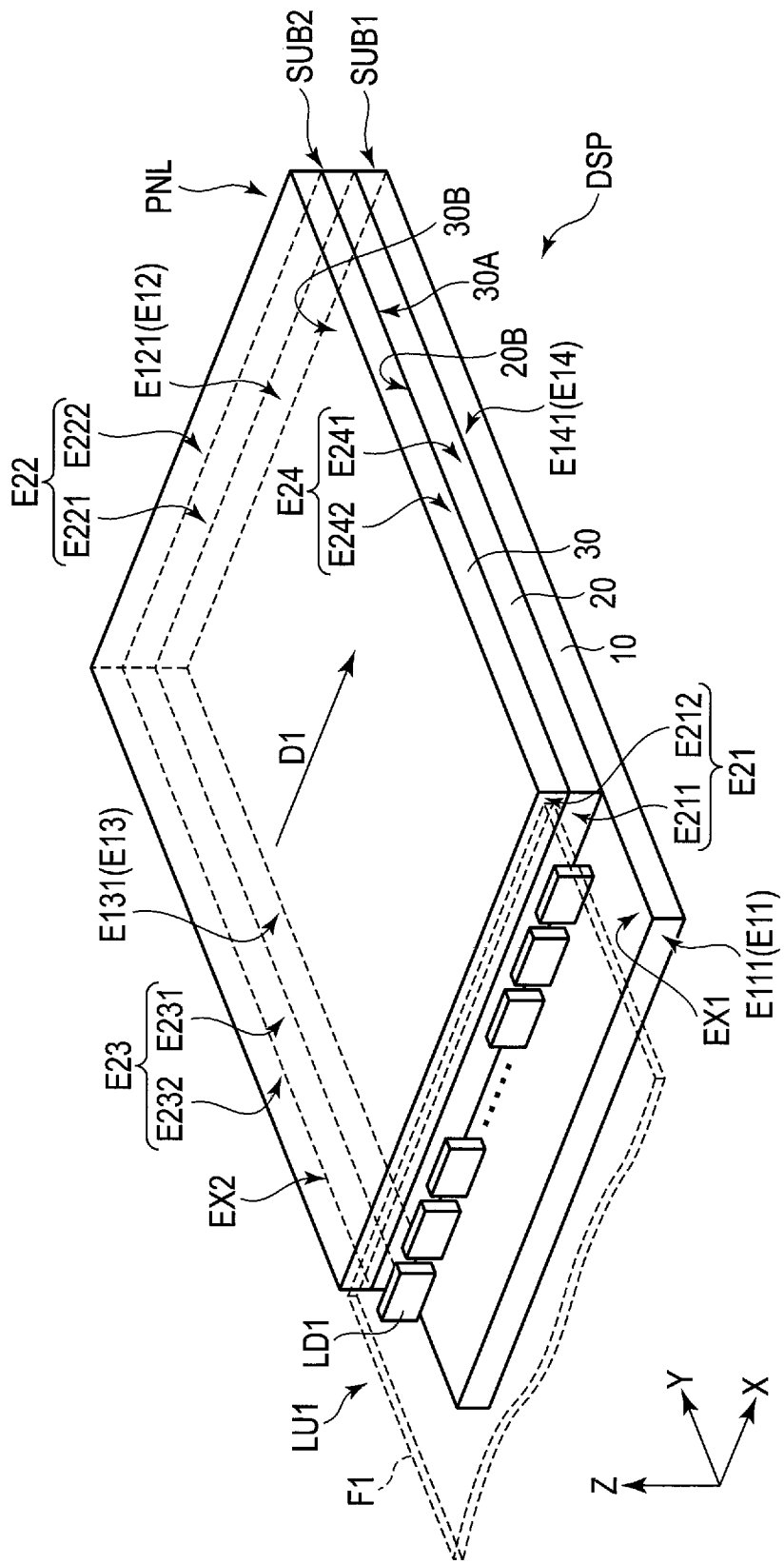
F I G. 3

DISPLAY DEVICE

CROSS-REFERENCE TO RELATED APPLICATIONS

This application is based upon and claims the benefit of priority from Japanese Patent Application No. 2019-060677, filed Mar. 27, 2019, the entire contents of which are incorporated herein by reference.

FIELD

Embodiments described herein relate generally to a display device.

BACKGROUND

Recently, various display devices have been proposed. An illumination device including a light modulation layer containing a bulk and microparticles having optical anisotropy in a light modulation element bonded to a light guide plate has been disclosed. In another example, a light source device including a light modulation unit which contains a polymer dispersed liquid crystal and modulates the intensity of incident light has been disclosed.

BRIEF DESCRIPTION OF THE DRAWINGS

FIG. 2 is a cross-sectional view showing a configuration example of a display panel shown in FIG. 1.

FIG. 3 is a perspective view showing main parts of the display device shown in FIG. 1.

DETAILED DESCRIPTION

Figure 1:
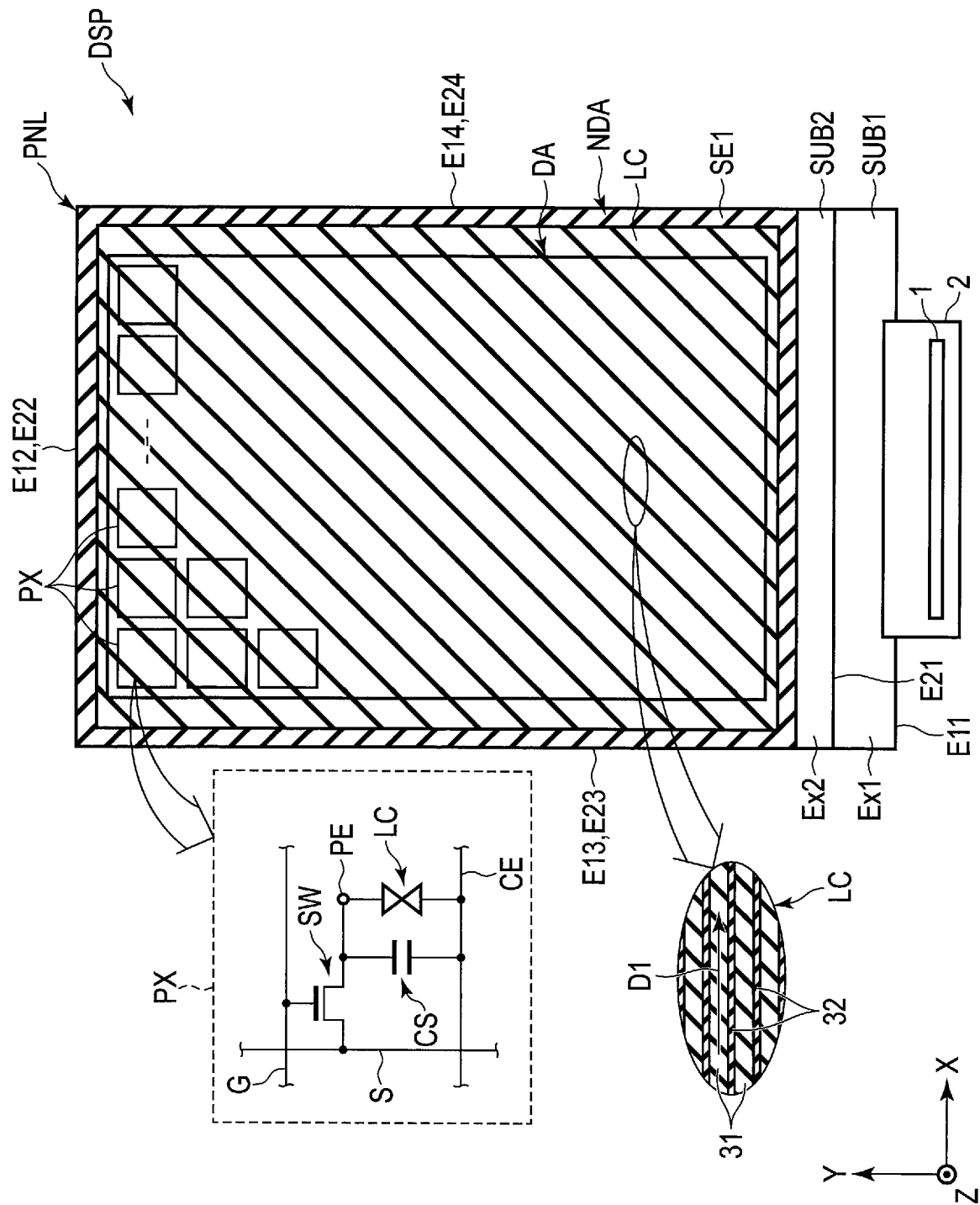
FIG. 1 is a plan view showing a configuration example of a display device of an embodiment.

In general, according to one embodiment, a display device comprising: a first substrate having a first end portion located in a non-display area around a display area where an image is displayed; a second substrate facing the first substrate and having a second end portion separated from the first end portion toward the display area in the non-display area; a liquid crystal layer located between the first substrate and the second substrate and containing a stripe-shaped polymer and liquid crystal molecules; a light-emitting element facing the second end portion; a first sealing member located closer to the display area than the second end portion in the non-display area and bonding the first substrate and the second substrate together; and a low refractive area located between the first substrate and the second substrate, located between the second end portion and the first sealing member in planar view, and containing a material having a refractive index lower than that of the second substrate.

According to another embodiment, a display device comprising: a first substrate having a first end portion located in a non-display area around a display area where an image is displayed and a second end portion located on an opposite side to the first end portion; a second substrate facing the first substrate and having a third end portion which is separated from the first end portion toward the display area in the non-display area and a fourth end portion which is located on an opposite side to the third end portion; a liquid crystal layer located between the first substrate and the second substrate and containing a stripe-shaped polymer and liquid crystal molecules; a light-emitting element facing the third end portion; and a sealing member disposed around the display area in the non-display area, located closer to the display area than the third end portion in the non-display area, and bonding the first substrate and the second substrate together, wherein a gap is located between the first substrate and the second substrate and between the third end portion and the sealing member in planar view, and a first distance from the third end portion to the sealing member is greater than a second distance from the fourth end portion to the sealing member.

The present embodiment and modification examples according to the embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by the same reference numbers, and detailed explanations of them that are considered redundant may be arbitrarily omitted.

Embodiment

FIG. 1 is a plan view showing a configuration example of a display device DSP of the present embodiment. A first direction X, a second direction Y and a third direction Z are, for example, orthogonal to one another but may cross at an angle other than 90 degrees. The first direction X and the second direction Y correspond to directions parallel to the main surface of a substrate constituting the display device DSP, and the third direction Z corresponds to the thickness direction of the display device DSP. In the present specification, a direction from a first substrate SUB1 toward a second substrate SUB2 will be referred to as upward (or simply above) and a direction from the second substrate SUB2 toward the first substrate SUB1 will be referred to as downward (or simply below). When described as "a second member above a first member" and "a second member below a first member", the second member may be in contact with the first member or may be away from the first member. In addition, an observation position at which the display device DSP is observed is assumed to be located on the pointing end side of an arrow indicating the third direction Z, and viewing from the observation position toward an X-Y plane defined by the first direction X and the second direction Y will be referred to as planar view. In the following, a length in the first direction X and a length in the second direction Y will be referred to as widths, and a length in the third direction Z will be referred to as a thickness in some cases. Furthermore, in planar view, a direction from a central portion toward a peripheral portion of the display device DSP will be referred to as outward and a direction from the peripheral portion toward the central portion will be referred to as inward in some cases.

In the present embodiment, a liquid crystal display device employing a polymer dispersed liquid crystal will be described as an example of the display device DSP. The display device DSP includes a display panel PNL, an IC chip 1 and a wiring substrate 2.

The display panel PNL includes a first substrate SUB1, a second substrate SUB2, a liquid crystal layer LC and a sealing member SE1. Each of the first substrate SUB1 and the second substrate SUB2 has the shape of a flat plate parallel to the X-Y plane. Note that each of the first substrate SUB1 and the second substrate SUB2 may not be parallel to the X-Y plane. The first substrate SUB1 and the second substrate SUB2 overlap in planar view. The first substrate SUB1 and the second substrate SUB2 are bonded together by the sealing member SE1. The liquid crystal layer LC is held between the first substrate SUB1 and the second substrate SUB2 and is sealed in by the sealing member SE1. In FIG. 1, the liquid crystal layer LC and the sealing member SE1 are indicated by different diagonal lines.

As shown in an enlarged schematic view within FIG. 1, the liquid crystal layer LC includes a polymer dispersed liquid crystal which contains a polymer 31 and liquid crystal molecules 32. For example, the polymer 31 is a liquid crystal polymer. The polymer 31 extends in a stripe-like manner. An extension direction Dl of the polymer 31 is parallel to the first direction X. The liquid crystal molecules 32 are dispersed in the gaps of the polymer 31 and are aligned such that major axes thereof become parallel to the first direction X. Each of the polymer 31 and the liquid crystal molecule 32 has optical anisotropy or refractive anisotropy. The responsiveness to an electric field of the polymer 31 is lower than the responsiveness to an electric field of the liquid crystal molecule 32.

For example, the alignment direction of the polymer 31 hardly changes regardless of the presence or absence of an electric field. On the other hand, the alignment direction of the liquid crystal molecule 32 changes according to an electric field in a state where a high voltage of greater than or equal to a threshold value is applied to the liquid crystal layer LC. In a state where voltage is not applied to the liquid crystal layer LC, the optical axis of the polymer 31 and the optical axis of the liquid crystal molecule 32 are parallel to each other, and light which enters the liquid crystal layer LC is transmitted through the liquid crystal layer LC and is hardly scattered in the liquid crystal layer LC (transparent state). In a state where voltage is applied to the liquid crystal layer LC, the optical axis of the polymer 31 and the optical axis of the liquid crystal molecule 32 cross each other, and light which enters the liquid crystal layer LC is scattered in the liquid crystal layer LC (scattering state).

The display panel PNL includes a display area DA in which an image is displayed, and a frame-shaped non-display area NDA which surrounds the display area DA. The display area DA includes pixels PX arrayed in a matrix in the first direction X and the second direction Y. The sealing member SE1 is arranged around the display area DA in the non-display area NDA.

As shown in an enlarged view within FIG. 1, each pixel PX includes a switching element SW, a pixel electrode PE, a common electrode CE, the liquid crystal LC and the like. The switching element SW is composed of, for example, a thin-film transistor (TFT) and is electrically connected to a scanning line G and a signal line S. The scanning line G is electrically connected to the switching elements SW in the respective pixels PX arranged in the first direction X. The signal line S is electrically connected to the switching elements SW in the respective pixels PX arranged in the second direction Y. The pixel electrode PE is electrically connected to the switching element SW. Each pixel electrode PE faces the common electrode CE and drives the liquid crystal layer LC (more specifically, the liquid crystal molecules 32) by an electric field generated between the pixel electrode PE and the common electrode CE. Capacitance CS is formed, for example, between an electrode having the same potential as the common electrode CE and an electrode having the same potential as the pixel electrode PE.

The first substrate SUB1 has end portions E11 and E12 extending in the first direction X and end portions E13 and E14 extending in the second direction Y. The second substrate SUB2 has end portions E21 and E22 extending in the first direction X and end portions E23 and E24 extending in the second direction Y. In the example shown in FIG. 1, the end portions E12 and E22, the end portions E13 and E23 and the end portions E14 and E24 overlap, respectively, in planar view. Note that the end portions E12 and E22, the end portions E13 and E23 and the end portions E14 and E24 may not overlap, respectively, in planar view. The end portion E21 is located between the sealing member SE1 and the end portion E11 in planar view. In other words, the end portion E21 is separated from the end portion E11 toward the display area DA. That is, the end portion E21 is located on the display area DA side with respect to the end portion E11.

The first substrate SUB1 has an extension portion Ex1 between the sealing member SE1 and the end portion E11. The extension portion Ex1 extends outward from the sealing member SE1 in the second direction Y. In the example shown in FIG. 1, the extension portion Ex1 extends on the outside with respect to the end portion E21 of the second substrate SUB2 in the second direction Y. Note that part of the first substrate SUB1 which extends on the outside with respect to the end portion E21 in the second direction Y may be referred to as the extension portion Ex1. In other words, part of the first substrate SUB1 which is located between the end portion E21 and the end portion E11 in the second direction Y may be referred to as the extension portion Ex1. In addition, part of the first substrate SUB1 which extends outward from the display area DA in the second direction Y may be referred to as the extension portion Ex1.

The second substrate SUB2 has an extension portion Ex2 between the sealing member SE1 and the end portion E21.

The extension portion Ex2 extends outward from the sealing member SE1 in the second direction Y. In the example shown in FIG. 1, the extension portion Ex2 overlaps the extension portion Ex1. Note that part of the second substrate SUB2 which extends outward from the display area DA in the second direction Y may be referred to as the extension portion Ex2.

The wiring substrate 2 is electrically connected to the extension portion Ex1. The wiring substrate 2 is a bendable flexible printed circuit. The IC chip 1 is electrically connected to the wiring substrate 2. For example, a display driver which outputs a signal necessary for image display, etc., is incorporated in the IC chip 1. Note that the IC chip 1 may be electrically connected to the extension portion Ex1. The IC chip 1 and the wiring substrate 2 read signals from the display panel PNL in some cases but mainly function as signal sources which supply signals to the display panel PNL.

FIG. 2 is a cross-sectional view showing a configuration example of the display panel PNL shown in FIG. 1. FIG. 2 only shows configurations necessary for explanation.

The first substrate SUB1 includes a transparent substrate 10, insulating layers 11 and 12, a capacitance electrode CPE, the switching element SW, the pixel electrode PE and an alignment film AL1. The first substrate SUB1 further includes the scanning line G and the signal line S shown in FIG. 1. The first substrate SUB1 has a main surface (lower surface) S1A and a counter surface (upper surface) S1B on the opposite side to the main surface S1A. The transparent substrate 10 has a main surface (lower surface) 10A and a counter surface (upper surface) 10B on the opposite side to the main surface 10A. In the example shown in FIG. 2, the main surface 10A corresponds to the main surface S1A of the first substrate SUB1. The switching element SW is located on the counter surface 10B side. The insulating layer 11 covers the switching element SW. The capacitance electrode CPE is located between the insulating layers 11 and 12. The pixel electrode PE is disposed for each pixel PX on the insulating layer 12. The pixel electrode PE is electrically connected to the switching element SW via an opening OP of the capacitance electrode CPE. The pixel electrode PE overlaps the capacitance electrode CPE via the insulating layer 12 and forms the capacitance CS of the pixel PX. The alignment film AL1 covers the pixel electrode PE. In the example shown in FIG. 2, the upper (second substrate SUB2 side) surface of the alignment film AL1 corresponds to the counter surface S1B of the first substrate SUB1. Note that the first substrate SUB1 is not limited to the example illustrated but may include other insulating layers or various other layers. The first substrate SUB1 may not include any of the insulating layers and the other layers illustrated.

The second substrate SUB2 includes transparent substrates 20 and 30, a transparent adhesive layer AD1, a light-shielding layer BM, the common electrode CE and an alignment film AL2. The second substrate SUB2 faces the first substrate SUB1. The second substrate SUB2 has a main surface (lower surface) S2A and a counter surface (upper surface) S2B on the opposite side to the main surface S2A. The main surface S2A faces the counter surface S1B. The transparent substrate 20 faces the transparent substrate 10. The transparent substrate 20 has a main surface (lower surface) 20A and a counter surface (upper surface) 20B on the opposite side to the main surface 20A. The main surface 20A faces the counter surface 103. The transparent substrate 30 faces the transparent substrate 20 on the opposite side to the transparent substrate 10. The transparent substrate 30 has a main surface (lower surface) 30A and a counter surface (upper surface) 30B on the opposite side to the main surface 30A. The main surface 30A faces the counter surface 20B. In the example shown in FIG. 2, the counter surface 30B corresponds to the counter surface S2B of the second substrate SUB2. The transparent adhesive layer AD1 is located between the counter surface 20B and the main surface 30A. The transparent adhesive layer AD1 is applied to substantially the entire counter surface 20B and the entire main surface 30A, and bonds the transparent substrate 20 and the transparent substrate 30 together. In other words, the transparent substrate 30 is bonded to the transparent substrate 20 via the transparent adhesive layer AD1. Note that various layers other than the transparent adhesive layer AD1 may be located between the transparent substrate 20 and the transparent substrate 30. The light-shielding layer BM and the common electrode CE are located on the main surface 20A side. The light-shielding layer BM is located, for example, directly above the switching element SW and directly above the scanning line G and the signal line S which are not illustrated. The common electrode CE is disposed over the pixels PX and directly covers the light-shielding layer BM. The common electrode CE is electrically connected to the capacitance electrode CPE and has the same potential as the capacitance electrode CPE. The alignment film AL2 covers the common electrode CE. In the example shown in FIG. 2, the lower (first substrate SUB1 side) surface of the alignment film AL2 corresponds to the main surface S2A of the second substrate SUB2. Note that the second substrate SUB2 is not limited to the example illustrated but may include other insulating layers or various other layers. For example, other insulating layers or various other layers may be included between the alignment film AL2 and the common electrode CE, or other insulating layers or various other layers may be included between the common electrode CE/the light-shielding layer BM and the transparent substrate 20. The second substrate SUB2 may not include any of the insulating layers and the other layers illustrated. In addition, the transparent substrate 30 and the transparent adhesive layer AD1 may be separately provided from the second substrate SUB2.

The liquid crystal layer LC is located between the counter surface S1B and the main surface S2A and is in contact with the alignment films AL1 and AL2. In other words, the liquid crystal layer LC is located between the counter surface 10B and the main surface 20A and is in contact with the alignment films AL1 and AL2. In the display panel PNL, the insulating layers 11 and 12, the capacitance electrode CPE, the switching element SW, the pixel electrode PE and the alignment film AL1 are located between the counter surface 10B and the liquid crystal layer LC. In the display panel PNL, the light-shielding layer BM, the common electrode CE and the alignment film AL2 are located between the main surface 20A and the liquid crystal layer LC.

Each of the transparent substrates 10 and 20 is an insulating substrate such as a glass substrate or a plastic substrate. The transparent substrate 30 is formed of, for example, transparent glass or transparent resin such as poly(methyl methacrylate) (PMMA) or polycarbonate (PC). The main surface 10A and the counter surface 10B, the main surface 20A and the counter surface 20B, and the main surface 30A and the counter surface 30B are surfaces substantially parallel to the X-Y plane. Note that the main surface 10A and the counter surface 10B, the main surface 20A and the counter surface 20B, and the main surface 30A and the counter surface 30B may not be substantially parallel to the X-Y plane. The insulating layer 11 is formed of a transparent insulating material such as silicon oxide, silicon nitride, silicon oxynitride or acrylic resin. For example, the insulating layer 11 includes an inorganic insulating layer and an organic insulating layer. Note that the insulating layer 11 may be formed of a plurality of layers stacked one on top of another. The insulating layer 12 is an inorganic insulating layer such as silicon nitride. Each of the capacitance electrode CPE, the pixel electrode PE and the common electrode CE is a transparent electrode formed of a transparent conductive material such as indium tin oxide (ITO) or indium zinc oxide (IZO). The light-shielding layer BM is, for example, a conductive layer having a resistance lower than that of the common electrode CE. For example, the light-shielding layer BM is formed of a nontransparent metal material such as molybdenum, aluminum, tungsten, titanium or silver. Each of the alignment films AL1 and AL2 is a horizontal alignment film having an alignment restriction force substantially parallel to the X-Y plane. For example, the alignment films AL1 and AL2 are subjected to alignment treatment in the first direction X. Note that the alignment treatment may be rubbing treatment or may be photoalignment treatment.

FIG. 3 is a perspective view showing main parts of the display device DSP shown in FIG. 1.

The display device DSP includes the transparent substrate 30 and a light source unit LU1 in addition to the display panel PNL. The light source unit LU1 is located in the extension portion Ex1. The transparent substrate 10, the transparent substrate 20 and the transparent substrate 30 are arranged in this order in the third direction Z.

The transparent substrate 10 has end portions E111 and E121 extending in the first direction X and end portions E131 and E141 extending in the second direction Y. In the example shown in FIG. 3, the end portion E111 corresponds to the end portion E11 of the first substrate SUE1, the end portion E121 corresponds to the end portion E12 of the first substrate SUE1, the end portion E131 corresponds to the end portion E13 of the first substrate SUB1, and the end portion E141 corresponds to the end portion E14 of the first substrate SUB1.

The transparent substrate 20 has end portions E211 and E221 extending in the first direction X and end portions E231 and E241 extending in the second direction Y. The transparent substrate 30 has end portions E212 and E222 extending in the first direction X and end portions E232 and E242 extending in the second direction Y. In the example shown in FIG. 3, the end portions E211 and E212, the end portions E221 and E222, the end portions E231 and E232 and the end portions E241 and E242 overlap, respectively. The end portions E211 and E212 correspond to the end portion E21 of the second substrate SUB2, the end portions E221 and E222 correspond to the end portion E22 of the second substrate SUB2, the end portions E231 and E232 correspond to the end portion E23 of the second substrate SUB2, and the end portions E241 and E242 correspond to the end portion E24 of the second substrate SUB2. In other words, the end portions E211 and E212 constitute the end portion E21 of the second substrate SUB2, the end portions E221 and E222 constitute the end portion E22 of the second substrate SUB2, the end portions E231 and E232 constitute the end portion E23 of the second substrate SUB2, and the end portions E241 and E242 constitute the end portion E24 of the second substrate SUB2. Note that the end portions E211 and E212, the end portions E221 and E222, the end portions E231 and E232 and the end portions E241 and E242 may not overlap, respectively.

The light source unit LU1 includes a plurality of light-emitting elements LD1 and a wiring substrate F1. The light-emitting elements LD1 are arranged with a gap in between in the extension direction D1 of the polymer 31 shown in FIG. 1. The light-emitting elements LD1 are connected to the wiring substrate F1. The light-emitting elements LD1 are located between the first substrate SUB1 (for example, the transparent substrate 10) and the wiring substrate F1. In the example shown in FIG. 3, the light-emitting elements LD1 are located between the transparent substrate 10 and the wiring substrate F1. The light-emitting elements LD1 face the end portion E21 of the second substrate SUB2. In the example shown in FIG. 3, the light-emitting elements LD1 face the end portion E211 of the transparent substrate 20 and the end portion E212 of the transparent substrate 30. Light emitted from the light-emitting elements LD1 travels in the direction of an arrow indicating the second direction Y. The light-emitting elements LD1 are, for example, light-emitting diodes. Note that the light source unit LU1 is not limited to the example illustrated but may include an optical member, etc. The light source unit LU1 may face the end portion E11, E12, E13 or E14 of the first substrate SUB1 or may face the end portion E22, E23 or E24 of the second substrate SUB2. The display device DSP may include a plurality of light source units. Each of the light source units may face any one of the end portions E11 to E14 and the end portions E21 to E24. For example, one light source unit may face the end portion E21, and the other light source unit may face the end portion E12. In this case, the first substrate SUB1 may have an extension portion corresponding to the extension portion Ex2 on the end portion E12 side. In addition, the second substrate SUB2 may have an extension portion corresponding to the extension portion Ex1 on the end portion E22 side.

Figure 4:
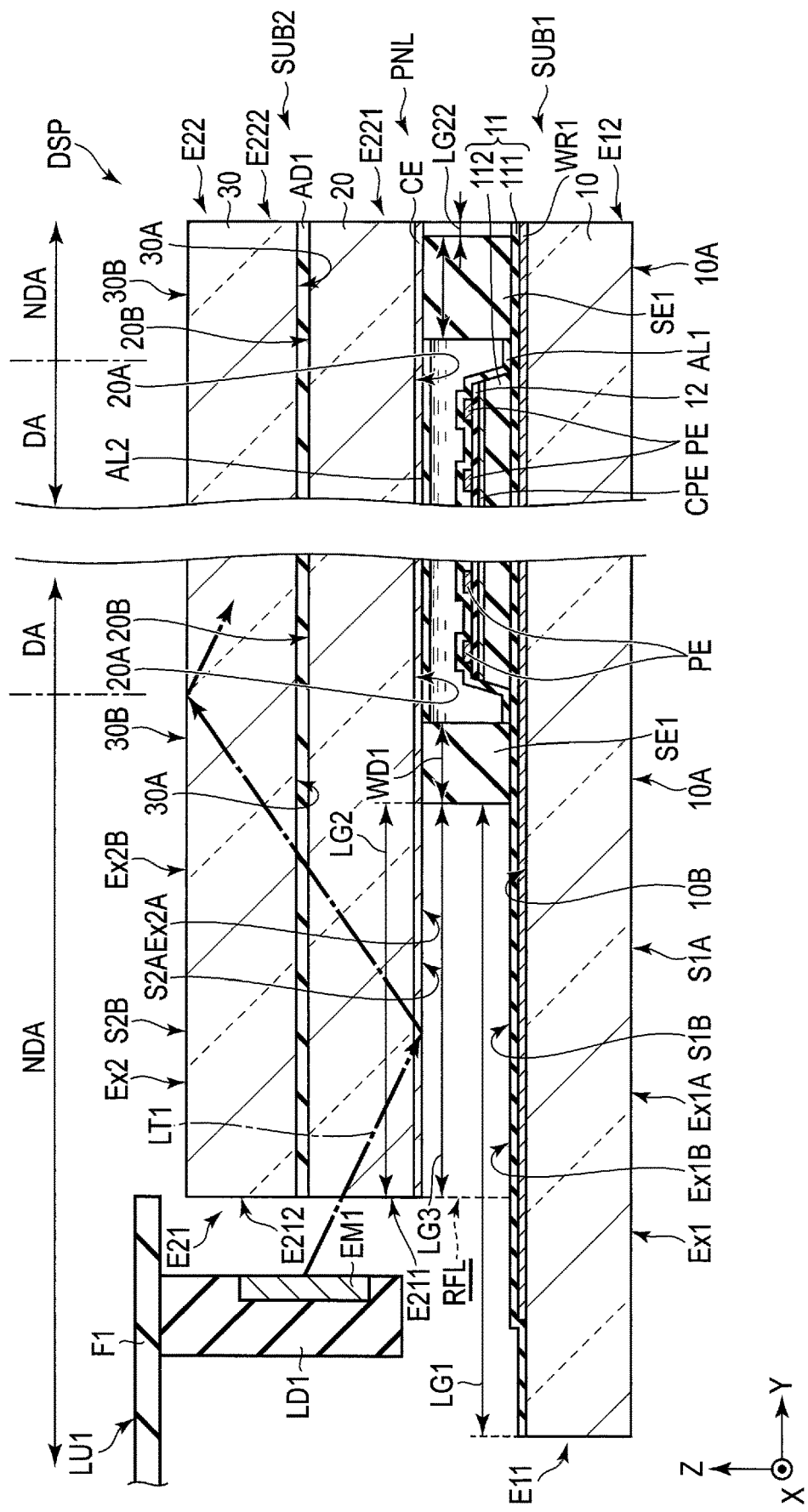
FIG. 4 is an enlarged cross-sectional view of the vicinity of an extension portion of a second substrate.

FIG. 4 is an enlarged cross-sectional view of the vicinity of the extension portion Ex2 of the second substrate SUB2. Note that only main parts of the display device DSP are shown in FIG. 4.

In the example shown in FIG. 4, the extension portion Ex1 has a main surface (lower surface) Ex1A and a counter surface (upper surface) Ex1B on the opposite side to the main surface Ex1A. The main surface Ex1A corresponds to part of the main surface S1A on the end portion E11 side. The counter surface Ex1B corresponds to part of the counter surface S1B on the end portion E11 side. The extension portion Ex1 extends outward from the sealing member SE1 and has a width (length) LG1 in the second direction Y.

The first substrate SUB1 further includes insulating layers 111 and 112 and a metal line WR1. In the example shown in FIG. 4, the metal line WR1 is located on the transparent substrate 10. The metal line WR1 extends from the display area DA toward the end portion E11. For example, the metal line WR1 extends from the display area DA to a predetermined position located on the outside with respect to the sealing member SE1. In other words, the metal line WR1 is disposed from the display area DA to the extension portion Ex1. The metal line WR1 is formed of, for example, the same material as the scanning line G or the signal line S. Note that other insulating layers and various other layers may be located between the transparent substrate 10 and the metal lien WR1. The insulating layer 111 covers the metal line WR1. The insulating layer 111 extends from the display area DA to a predetermined position located on the outside with respect to the sealing member SE1. In other words, the insulating layer 111 is disposed from the display area DA to the extension portion Ex1. In the extension portion Ex1, the upper (second substrate SUB2 side) surface of the insulating layer 111 corresponds to the counter surface Ex1B of the extension portion Ex1. The insulating layer 111 is formed of, for example, a transparent inorganic insulating material such as silicon nitride or silicon oxide. Note that other insulating layers or other various layers may be located between the metal line WR1 and the insulating layer 111. In the extension portion Ex1, insulating layers or various other layers may be located on the insulating layer 111. In addition, the insulating layer 111 may be formed of a material other than an inorganic insulating material. The insulating layer 112 covers the insulating layer 111 on the inside (display area DA side) with respect to the sealing member SE1. The insulating layer 112 is formed of, for example, a transparent organic insulating member such as acrylic resin. Note that the insulating layer 112 may be formed of a material other than an organic insulating material. In addition, other insulating layers or various other layers may be located between the insulating layers 111 and 112. The insulating layers 111 and 112 correspond to, for example, the insulating layer 11 shown in FIG. 2. The capacitance electrode CPE is located on the insulating layer 112 on the inside with respect to the sealing member SE1. Note that other insulating layers or various other layers may be located between the insulating layer 112 and the capacitance electrode CPE. In addition, the first substrate SUB1 is not limited to the example shown in FIG. 4 but may have another layer structure.

In the example shown in FIG. 4, the extension portion Ex2 has a main surface (lower surface) Ex2A and a counter surface (upper surface) Ex2B on the opposite side to the main surface Ex2A. The main surface Ex2A corresponds to part of the main surface S2A on the end portion E21 side. The counter surface Ex2B corresponds to part of the counter surface S2B on the end portion E21 side. The extension portion Ex2 extends outward from the sealing member SE1 and has a width (distance) LG2 in the second direction Y. The width LG2 of the extension portion Ex2 is, for example, less than the width LG1 of the extension portion Ex1. In addition, the width LG2 of the extension portion Ex2 is greater than a width WD1 in the second direction Y of the sealing member SE1. In other words, the width LG2 of the extension portion Ex2 from the sealing member SE1 to the end portion E21 is greater than the width WD1 of the sealing member SE1. For example, the width LG2 is greater than or equal to five times the width WD1. Note that the width LG2 may be less than five times the width WD1. The width LG2 may be greater than the width LG1. In addition, a width (distance) LG22 in the second direction Y from the end portion E22, which is located on the opposite side to the end portion E21, to the sealing member SE1 differs from the width LG2. In the example shown in FIG. 4, the width LG22 is less than the width LG2. In other words, the width LG2 from the sealing member SE1 to the end portion E21 is greater than the width (distance) LG22 from the end portion E22 to the sealing member SE1.

The common electrode CE is disposed, for example, on the entire main surface 20A. In the example shown in FIG. 4, in the second substrate SUB2, the common electrode CE extends from the display area DA to a predetermined position located on the outside with respect to the sealing member SE1. In other words, the common electrode CE is disposed from the display area DA to the extension portion Ex2. The common electrode CE is exposed in the extension portion Ex2. In the extension portion Ex2, the lower (first substrate SUB1 side) surface of the common electrode CE corresponds to the main surface Ex2A of the extension portion Ex2. In the extension portion Ex2, insulating layers or various other layers may be located below the common electrode CE. In addition, the common electrode CE may not be disposed from the display area DA to the extension portion Ex2. The second substrate SUB2 may not be limited to the example shown in FIG. 4 but may have another layer structure.

The display panel PNL (display device DSP) further includes a low refractive area RFL. The low refractive area RFL is formed of a material having a refractive index lower than the refractive index of the second substrate SUB2 (referred to also as a low refractive material) or a member which reflects light. In other words, the low refractive area RFL is formed of a material having a refractive index lower than the refractive index of the extension portion Ex2 or a member which reflects light. In the example shown in FIG. 4, the low refractive area RFL is a layer formed of a material having a refractive index lower than the refractive index of the common electrode CE, for example, an air layer. The low refractive area RFL is located, for example, on the outside with respect to at least the sealing member SE1 between the metal line WR1 and the main surface 20A of the transparent substrate 20. In the example shown in FIG. 4, the low refractive area RFL is located from the end portion E21 (E211 and E212) to the sealing member SE1 between the first substrate SUB1 and the second substrate SUB2. In addition, the low refractive area RFL is located between the extension portions Ex1 and Ex2. In other words, the low refractive area RFL is located in at least part of the gap between the end portion E21 and the sealing member SE1 in planar view. The extension portion Ex1, the low refractive area RFL and the extension portion Ex2 are successively arranged in this order in the third direction Z. In other words, the extension portion Ex1 and the low refractive area RFL are adjacent to each other in the third direction Z, and the low refractive area RFL and the extension portion Ex2 are adjacent to each other in the third direction Z. The main surface Ex2A corresponds to the interface between the extension portion Ex2 and the low refractive area RFL. A width LG3 in the second direction Y of the low refractive area RFL is substantially the same as the width LG2 of the extension portion Ex2. In other words, the width LG3 of the low refractive area RFL from the sealing member SE1 to the end portion E21 is greater than the width WD1 of the sealing member SE1. Note that the width LG3 of the low refractive area RFL may be greater than the width LG2 of the extension portion Ex2 or may be less than the width LG2.

Although the low refractive area RFL is described as an air layer in the present embodiment, the low refractive area RFL is not limited to this. As the low refractive area RFL, for example, a resin layer having a refractive index lower than the refractive index of the common electrode CE or an inorganic layer having an inorganic material may be used. The material of the low refractive resin layer is, for example, siloxane resin or fluorine resin. In addition, the low refractive inorganic material is, for example, silicon oxide.

The light-emitting element LD1 has a light-emitting portion EM1. The light-emitting portion EM1 faces the end portion E21. The light-emitting portion EM1 is separated from the end portion E21 in the second direction Y. The light-emitting portion EM1 has a red light-emitting portion, a green light-emitting portion, a blue light-emitting portion, and the like. The light-emitting portions of the respective colors may be arranged in the first direction X or may not be arranged in the first direction X. In addition, the light-emitting portions of the respective colors may be arranged in the third direction Z or may be arranged in the third direction Z.

Light LT1 of the light emitted from the light-emitting portion EM1 enters the second substrate SUB2 from the end portion E21, and travels through the second substrate SUB2 from the non-display area NDA side to the display area DA side while being reflected by the main surface S2A and the counter surface S2B. In other words, the light LT1 of the light emitted from the light-emitting portion EM1 enters the extension portion Ex2 from the end portion E21, and travels through the extension portion Ex2 from the non-display area NDA side to the display area DA side while being reflected by the main surface Ex2 and the counter surface Ex2B.

According to the present embodiment, the display device DSP includes the extension portion Ex1, the extension portion Ex2 and the low refractive area RFL. Each of the extension portion Ex1 and the extension portion Ex2 extends on the outside with respect to the sealing member SE1 in the second direction Y. The width LG2 of the extension portion Ex2 is greater than the width WD1 of the sealing member SE1. The low refractive area RFL is located between the extension portion Ex1 and the extension portion Ex2. The low refractive area RFL has a refractive index lower than the refractive index of the second substrate SUB2. The low refractive area RFL and the extension portion Ex2 are adjacent to each other in the third direction Z. The light LT1 of the light emitted from the light-emitting portion EM1 enters the extension portion Ex2 from the end portion E21 and travels through the extension portion Ex2 from the non-display area NDA to the display area DA while being reflected by the main surface Ex2A and the counter surface Ex2B. Light emitted from the plurality of light-emitting portions EM1 becomes uniform as the light travels through the extension portion Ex2, and uniform light enters the display area DA. Therefore, non-uniformity of light which can occur in the vicinity of the light-emitting portions EM1 can be improved. Consequently, the display device DSP which can suppress degradation in display quality can be provided.

In addition, the low refractive area RFL is located between the main surface 20A of the transparent substrate 20 and the metal line WR1. Light traveling toward the main surface Ex2A of the light traveling through the extending portion Ex2 from the non-display area NDA side to the display area DA side is reflected by the low refractive area RFL and does not reach the metal wire WR1. Therefore, undesired scattering or absorption in the metal line WR1 of the light traveling through the extension portion Ex2 can be suppressed. Consequently, degradation in display quality can be suppressed.

Next, modification examples of the present embodiment will be described with reference to FIGS. 5 to 14. In the modification examples of the present embodiment which will be described below, the same portions as those described above will be denoted by the same reference numbers and different portions from those described above will be mainly described in details. Note that the modification examples can also bring out advantages similar to those of the above-described embodiment.

Modification Example 1

A display device DSP of modification example 1 differs from the display device DSP of the above-described embodiment in the configuration of the second substrate SUB2.

Figure 5:
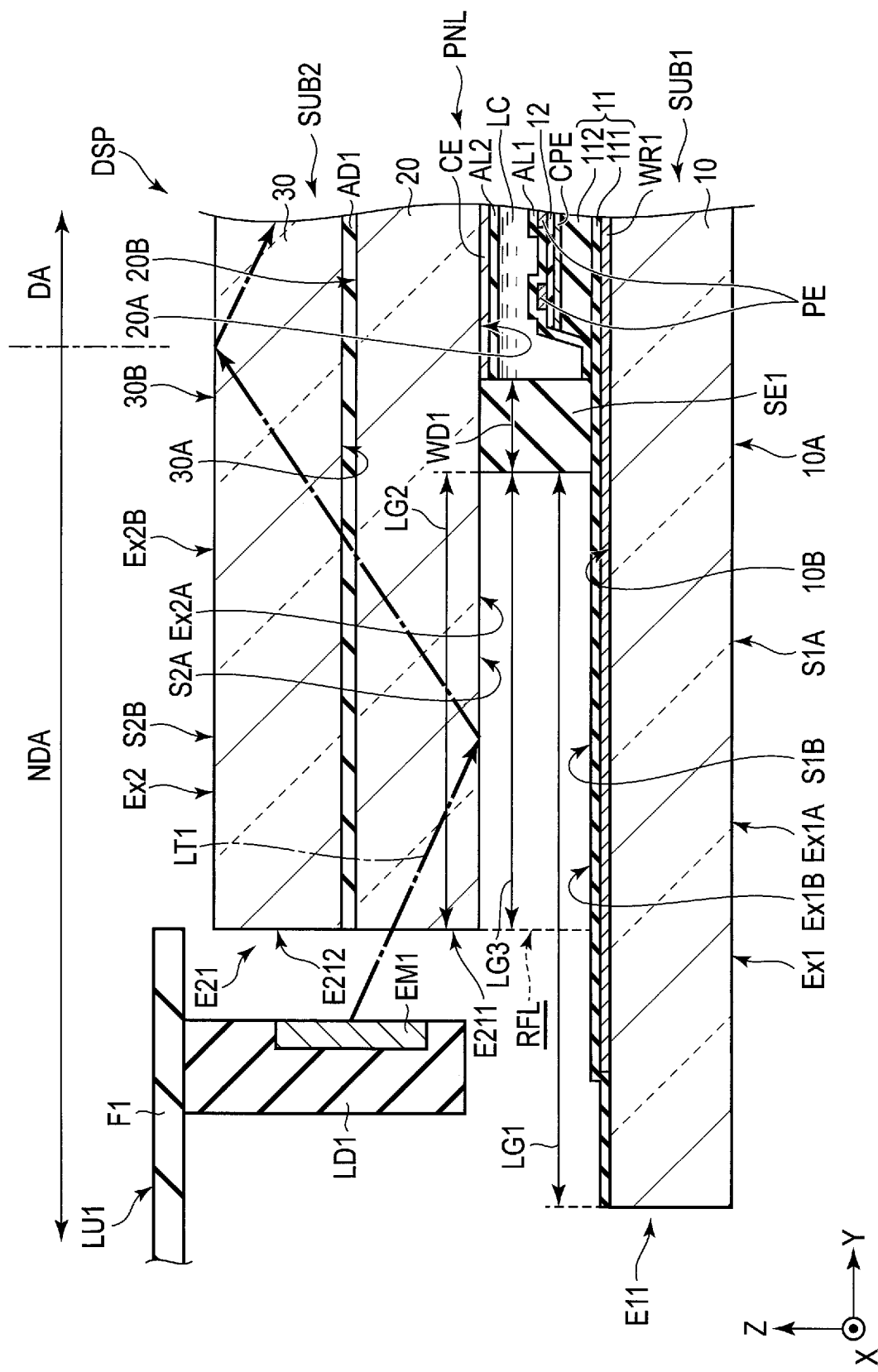
FIG. 5 is an enlarged cross-sectional view of the vicinity of an extension portion of a second substrate according to modification example 1.

FIG. 5 is an enlarged cross-sectional view of the vicinity of the extension portion Ex2 of the second substrate SUB2 according to modification example 1. Note that only main parts of the display device DSP are shown in FIG. 5.

In the example shown in FIG. 5, the transparent substrate 20 is exposed in the extension portion Ex2. In the extension portion Ex2, the main surface 20A of the transparent substrate 20 corresponds to the main surface Ex2A of the extension portion Ex2. In the extension portion Ex2, insulating layers or various other layers may be located below the main surface 20A. Therefore, the display device DSP according to modification example 1 has advantages similar to those of the above-described embodiment.

As the low refractive area RFL, in place of the above-described air layer, for example, a resin layer having a refractive index lower than the refractive index of the transparent substrate 20 or an inorganic layer having an inorganic material may be used. The material of the low refractive resin layer is, for example, siloxane resin or fluorine resin. In addition, the low refractive inorganic material is, for example, silicon oxide.

Modification Example 2

A display device DSP of modification example 2 differs from the display devices DSP of the above-described embodiment and the above-described modification example in the configuration of the sealing member.

Figure 6:
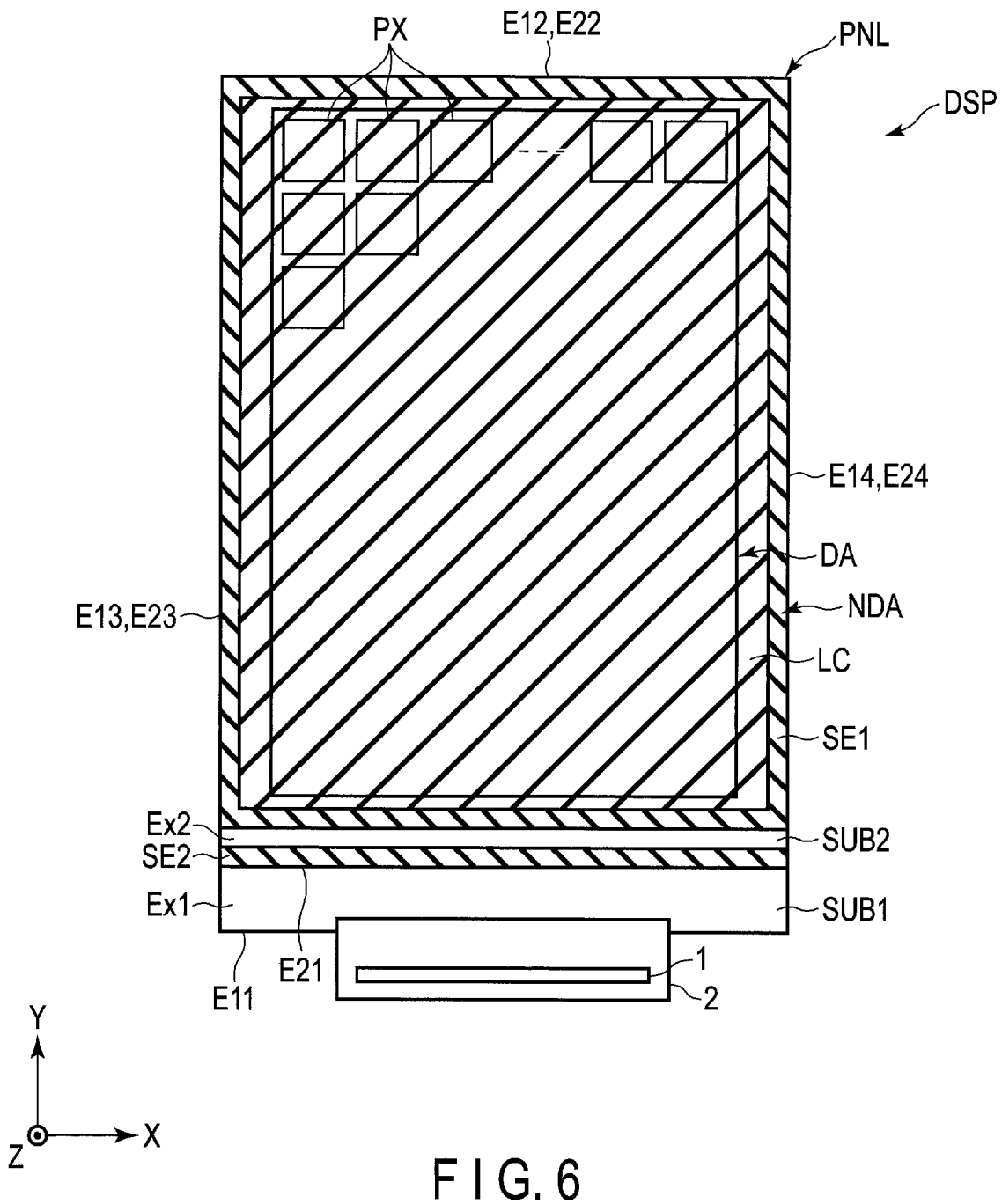
FIG. 6 is a plan view showing a configuration example of a display device of modification example 2.

FIG. 6 is a plan view showing a configuration example of the display device DSP of modification example 2.

The display panel PNL further includes a sealing member SE2. The first substrate SUB1 and the second substrate SUB2 are bonded together by the sealing members SE1 and SE2. The sealing member SE2 is located in the non-display area NDA. The sealing member SE2 overlaps the extension portions Ex1 and Ex2. The sealing member SE2 is separated from the sealing member SE1 toward the end portion E21 in the second direction Y. In the example shown in FIG. 6, the sealing member SE2 overlaps the end portion E21 in planar view. Note that the sealing member SE2 may not overlap the end portion E21.

Figure 7:
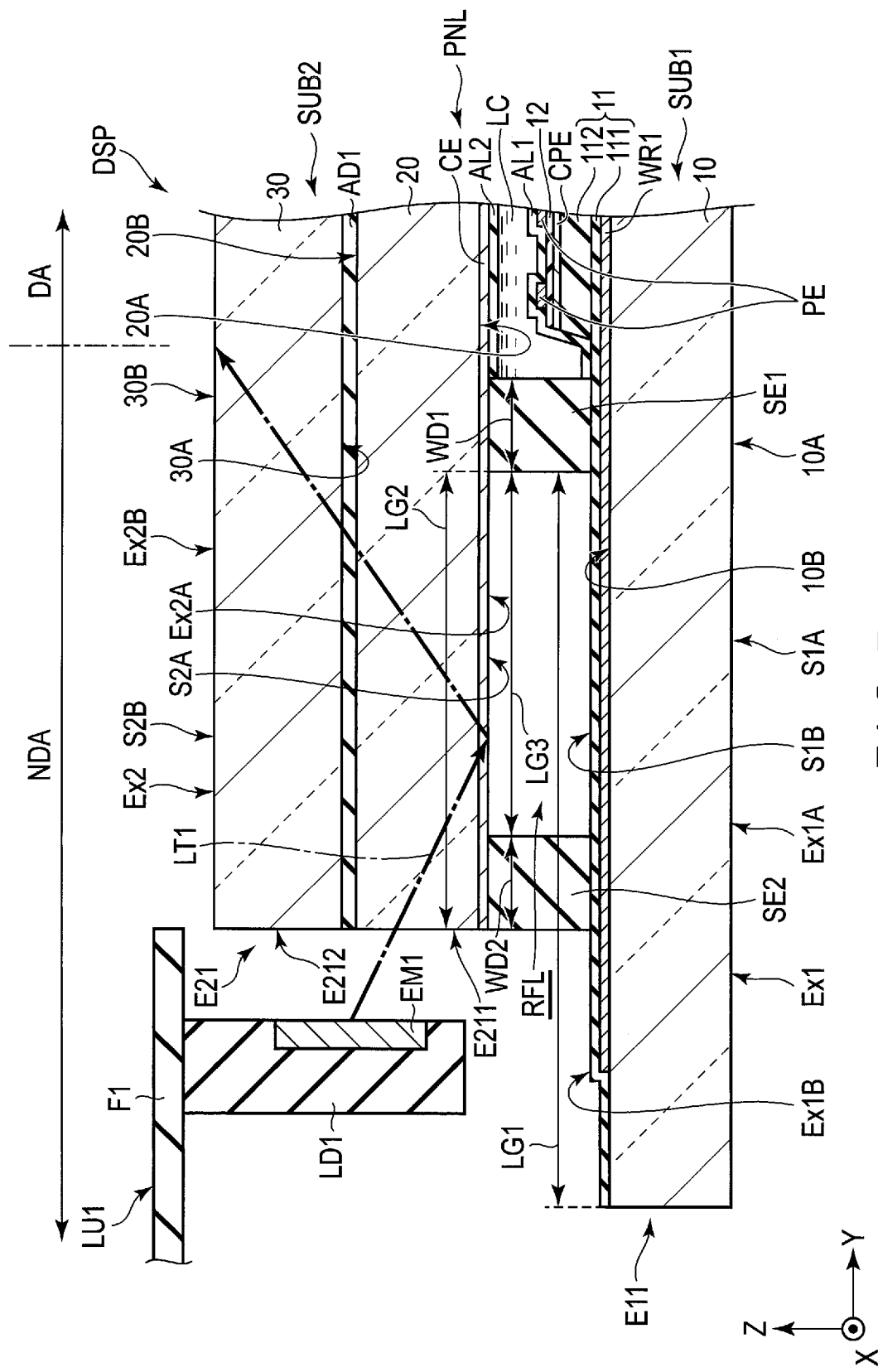
FIG. 7 is an enlarged cross-sectional view of the vicinity of an extension portion of a second substrate according to modification example 2.

FIG. 7 is an enlarged cross-sectional view of the vicinity of the extension portion Ex2 of the second substrate SUB2 according to modification example 2. Note that only main parts of the display device DSP are shown in FIG. 7.

The sealing member SE2 is located between the first substrate SUB1 and the second substrate SUB2. In the example shown in FIG. 7, the sealing member SE2 is separated from the sealing member SE1 toward the end portion E21 and is bonded to the counter surface Ex1B and the main surface Ex2A between the extension portions Ex1 and Ex2.

In the example shown in FIG. 7, the width LG2 of the extension portion Ex2 is greater than the sum of the width WD1 of the sealing member SE1 and a width WD2 in the second direction Y of the sealing member SE2. For example, the width WD2 is the same as the width WD1. Note that the width WD2 may be greater than the width WD1 or may be less than the width WD1.

In the example shown in FIG. 7, the low refractive area RFL is located between the sealing members SE1 and SE2 between the extension portions Ex1 and Ex2. The width LG3 of the low refractive area RFL is greater than the sum of the width WD1 of the sealing member SE1 and the width WD2 of the sealing member SE2. In other words, the width LG3 of the low refractive area RFL from the sealing member SE1 to the sealing member SE2 is greater than the sum of the width WD1 of the sealing member SE1 and the width WD2 of the sealing member SE2. In addition, the width LG3 of the low refractive area RFL is less than the width LG2 of the extension portion Ex2.

Therefore, the display device DSP according to modification example 2 has advantages similar to those of the above-described embodiment. In addition, since the extension portion Ex2 is supported by the sealing member SE2, the durability of the display device DSP is improved.

Modification Example 3

A display device DSP of modification example 3 differs from the display devices DSP of the above-described embodiment and the above-described modification examples in the configuration of the sealing member.

Figure 8:
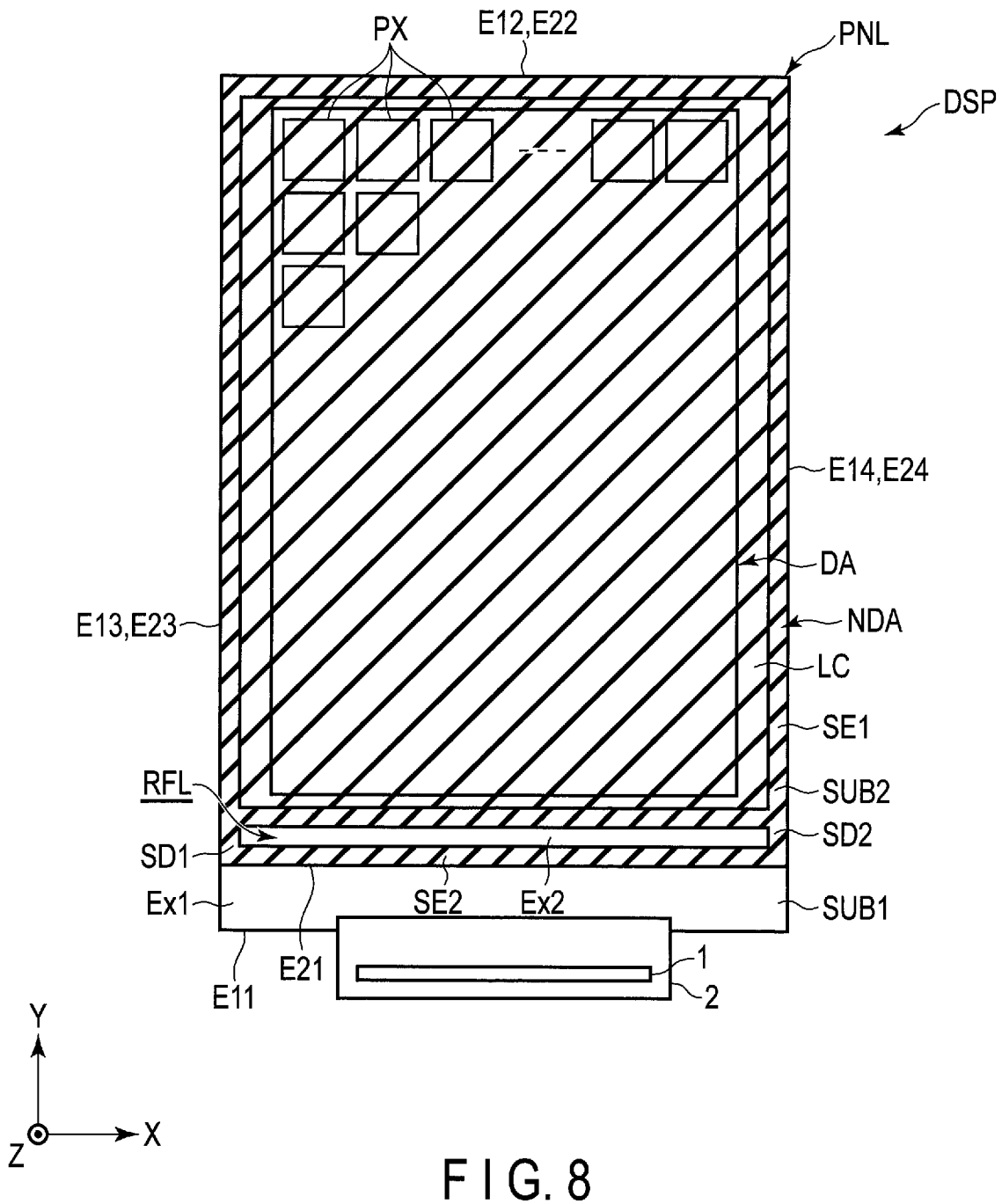
FIG. 8 is a plan view showing a configuration example of a display device of modification example 3.

FIG. 8 is a plan view showing a configuration example of the display device DSP of modification example 3. Note that a cross-section of the vicinity of the extension portion Ex2 of the second substrate SUB2 of modification example 3 is substantially the same as a cross-section of the vicinity of the extension portion Ex2 of the second substrate SUB2 of modification example 2 shown in FIG. 7.

The display panel PNL further includes sealing members SD1 and SD2. The first substrate SUB1 and the second substrate SUB2 are bonded together by the sealing members SE1, SE2, SD1 and SD2. The sealing members SE1 and SE2 are connected by the sealing members SD1 and SD2. The sealing members SE1, SE2, SD1 and SD2 are integrally formed. The sealing members SD1 and SD2 are located in the non-display area NDA. The sealing members SD1 and SD2 overlap the extension portions Ex1 and Ex2. The sealing member SD1 extends in the second direction Y along the end portions E13 and E23. The sealing member SD2 extends in the second direction Y along the end portions E14 and E24. The sealing members SD1 and SD2 are separated from each other in the first direction X. In the example shown in FIG. 8, the sealing member SD1 overlaps the end portions E13 and E23. The sealing member SD2 overlaps the end portions E14 and E24. Note that the sealing member SD1 may not overlap the end portions E13 and E23. The sealing member SD2 may not overlap the end portions E14 and E24.

In the example shown in FIG. 8, the low refractive area RFL is a vacuum layer. The low refractive area RFL is, for example, hermetically sealed by the sealing members SE1, SE2, SD1 and SD2 between the extension portions Ex1 and Ex2. Note that the low refractive area RFL may not be hermetically sealed by the sealing members SE1, SE2, SD1 and SD2 between the extension portions Ex1 and Ex2. In addition, the low refractive area RFL may be a layer other than a vacuum layer having a refractive index lower than the refractive index of the extension portion Ex2, for example, an air layer. Therefore, the display device DSP according to modification example 3 has advantages similar to those of the above-described embodiment.

Modification Example 4

A display device DSP of modification example 4 differs from the display devices DSP of the above-described embodiment and the above-described modification examples in the configuration of the low refractive area.

Figure 9:
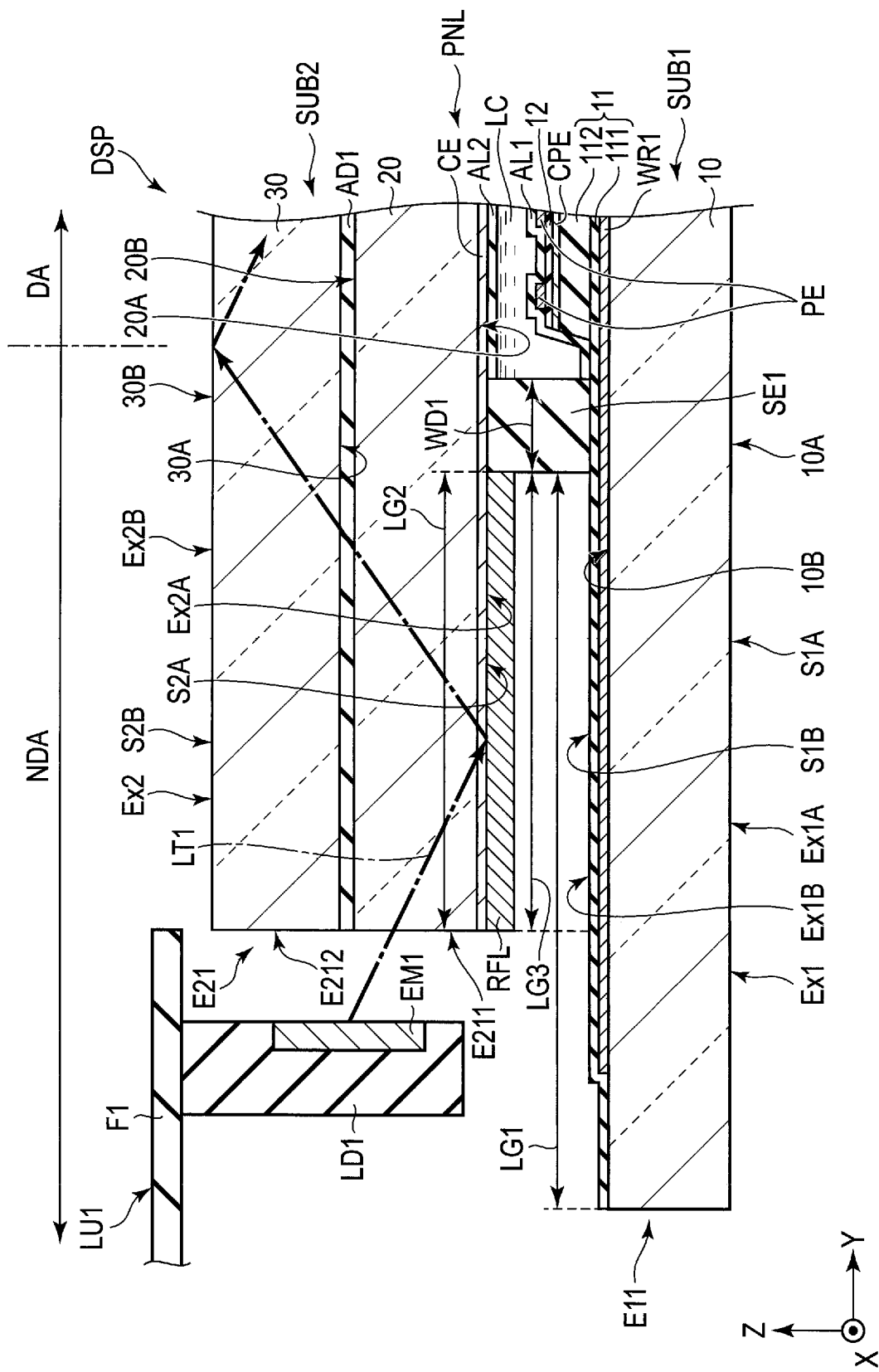
FIG. 9 is an enlarged cross-sectional view of the vicinity of an extension portion of a second substrate according to modification example 4.

FIG. 9 is an enlarged cross-sectional view of the vicinity of the extension portion Ex2 of the second substrate SUB2 according to modification example 4. Note that only main parts of the display device DSP are shown in FIG. 9.

In the example shown in FIG. 9, as the low refractive area RFL, the resin layer having a refractive index lower than the refractive index of the transparent substrate 20 or the inorganic layer having an inorganic material described above can be used. The low refractive area RFL is in contact with the main surface S2A of the second substrate SUB2 between the end portion E21 and the sealing member SE1. In other words, the low refractive area RFL is in contact with the main surface Ex2A of the extension portion Ex2. The low refractive area RFL is separated from the counter surface Ex1B of the extension portion Ex1 in the third direction Z. Note that the low refractive area RFL may be located between the extension portions Ex1 and Ex2 and may be in contact with the counter surface Ex1B of the extension portion Ex1 and the main surface Ex2A of the extension portion Ex2. Therefore, the display device DSP according to modification example 4 has advantages similar to those of the above-described embodiment.

The low refractive area RFL may be formed of a material which reflects light, for example, a metal material such as aluminum (Al) or an alloy of metal materials consisting predominantly of aluminum in place of the above-describe low refractive material.

Modification Example 5

A display device DSP of modification example 5 differs from the display devices of the above-described embodiment and the above-described modification examples in that an insulating layer REL is located between the low refractive area RFL and the extension portion Ex1.

Figure 10:
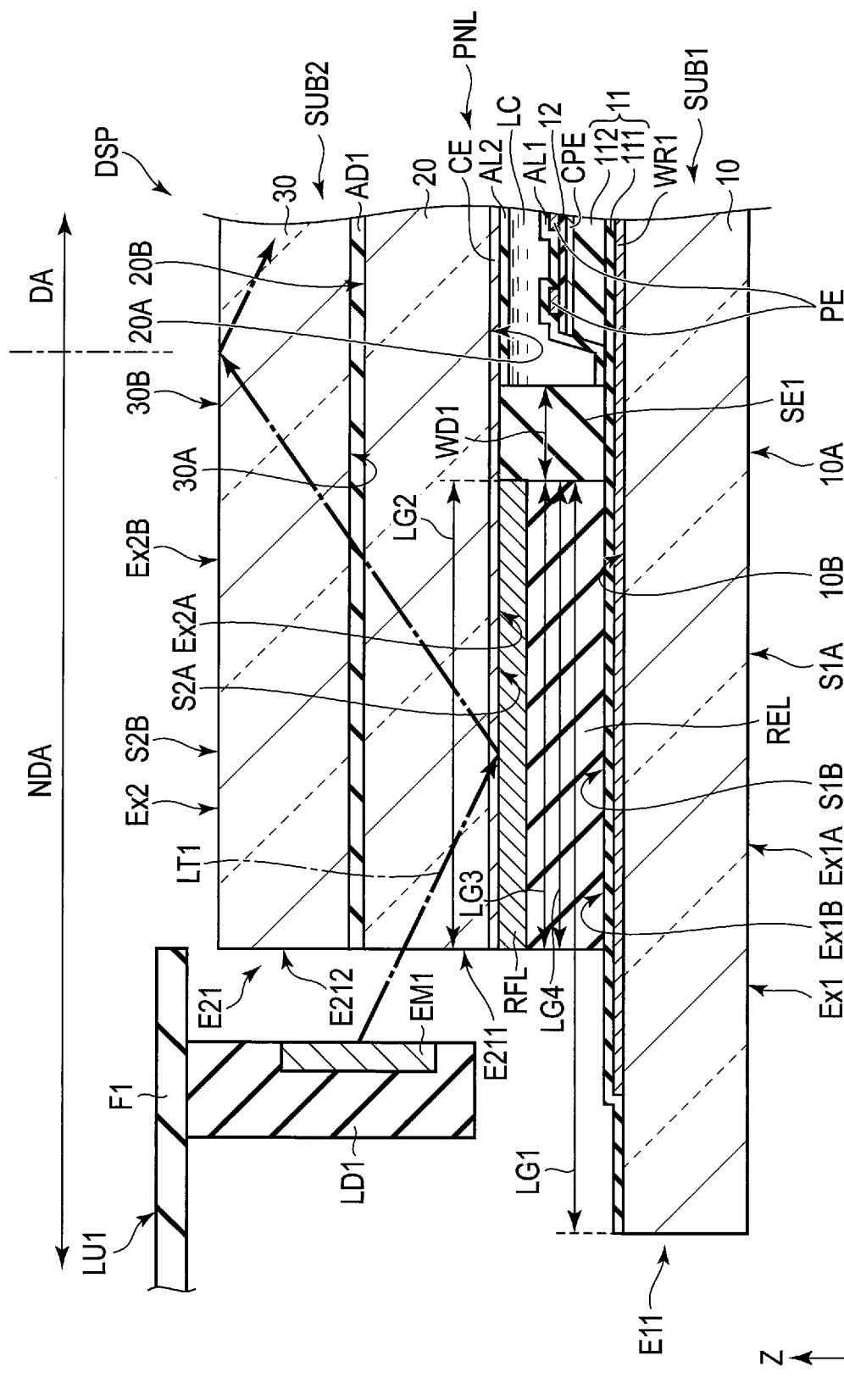
FIG. 10 is an enlarged cross-sectional view of the vicinity of an extension portion of a second substrate according to modification example 5.

FIG. 10 is an enlarged cross-sectional view of the vicinity of the extension portion Ex2 of the second substrate SUB2 according to modification example 5. Note that only main parts of the display device DSP are shown in FIG. 10.

In the example shown in FIG. 10, the low refractive area RFL is formed of the resin layer or inorganic layer having a refractive index lower than the refractive index of the transparent substrate 20 described above or the member which reflects light, for example, a metal material such as aluminum (A1) or an alloy of metal materials consisting predominantly of aluminum described in modification example 4. The law refractive area RFL is in contact with the main surface S2A of the second substrate SUB2 between the end portion E21 and the sealing member SE1. In other words, the low refractive area RFL is in contact with the main surface Ex2A of the extension portion Ex2. The low refractive area RFL is separated from the counter surface Ex1B of the extension portion Ex1 in the third direction Z.

The display panel PNL (display device DSP) further includes an insulating layer REL. The insulating layer REL is formed of, for example, resin or the same material as the sealing member SE1. The insulating layer REL is located on the outside of the sealing member SE1 in the second direction Y. The insulating layer REL is located between the low refractive area RFL and the extension portion Ex1 in the third direction Z. In the example shown in FIG. 10, the insulating layer REL is located between the end portion E21 and the sealing member SE1 in the second direction Y. The insulating layer REL is located between the law refractive area RFL and the extension portion Ex1 in the third direction Z and is in contact with the low refractive area RFL and the counter surface Ex1B of the extension portion Ex1. In other words, the insulating layer REL is located on the opposite side to the extension portion Ex2 side of the second substrate SUB2 with respect to the low refractive area RFL. A width LG4 in the second direction Y of the insulating layer REL is substantially the same as the width LG2 of the extension portion Ex2 and the width LG3 of the low refractive area RFL. Note that the width LG4 of the insulating layer REL may be greater than the width LG2 of the extension portion Ex2 or may be less than the width LG2. In addition, the width LG4 of the insulating layer REL may be greater than the width LG3 of the low refractive area RFL or may be less than the width LG3 of the low refractive area RFL.

Therefore, the display device DSP according to modification example 5 has advantages similar to those of the above-described embodiment. In addition, since the extension portion Ex2 is supported by the insulating layer REL, the durability of the display device DSP is improved.

Modification Example 6

A display device DSP of modification example 6 differs from the display devices DSP of the above-described embodiment and the above-described modification examples in that the second substrate SUB2 includes the low refractive area RFL.

Figure 11:
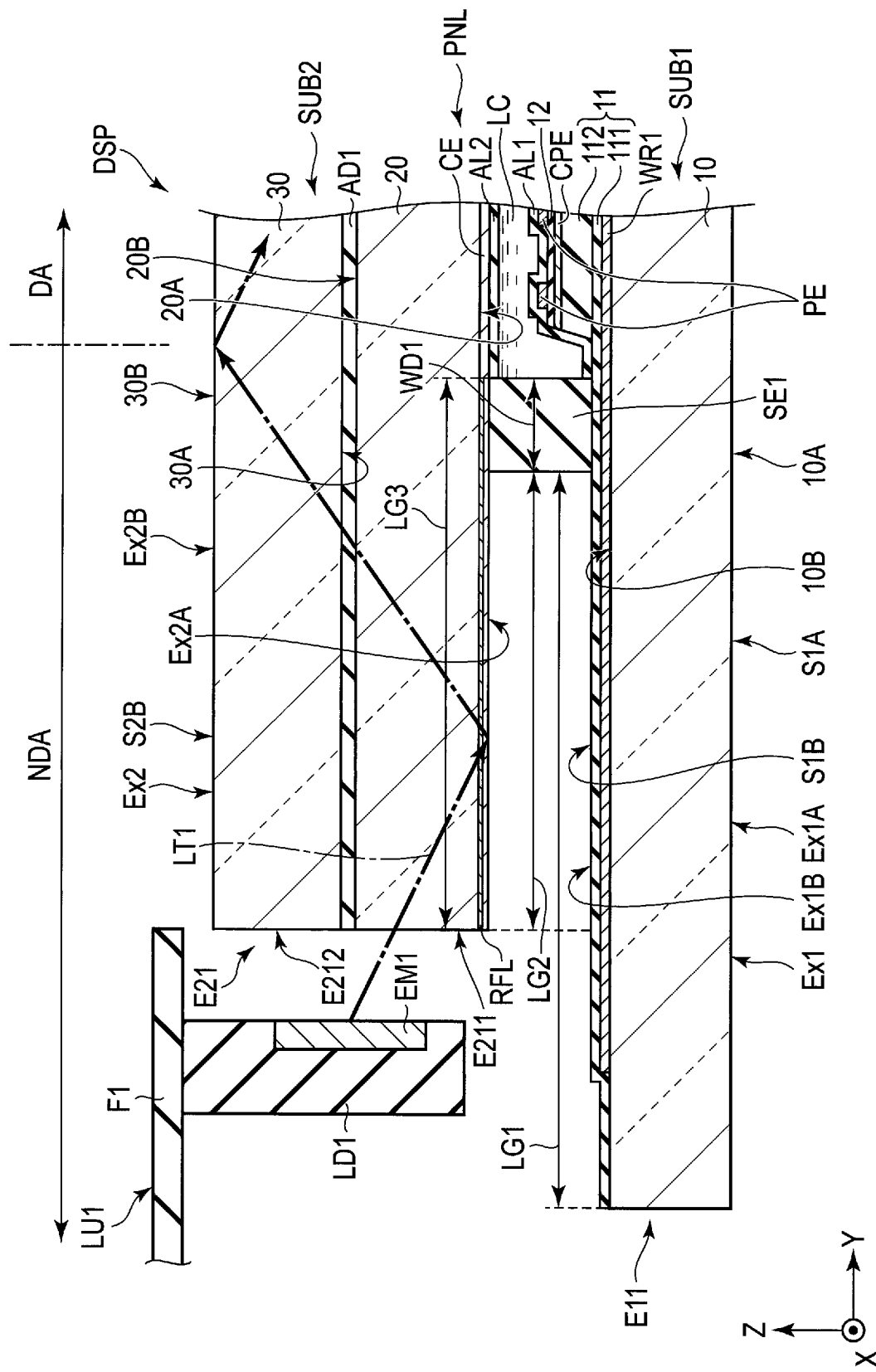
FIG. 11 is an enlarged cross-sectional view of the vicinity of an extension portion of a second substrate according to modification example 6.

FIG. 11 is an enlarged cross-sectional view of the vicinity of the extension portion Ex2 of the second substrate SUB2 according to modification example 6. Note that only main parts of the display device DSP are shown in FIG. 11.

The second substrate SUB2 further includes the low refractive area REL. The low refractive area REL is located, for example, on the main surface 20A side. In the example shown in FIG. 11, the low refractive area RFL is located between the common electrode CE and the transparent substrate 20. The low refractive area RFL extends from directly above the sealing member SE1 to the end portion E21 in the second direction Y. In other words, the low refractive area RFL overlaps the sealing member SE1 and extends from the sealing member SE1 to the end portion E21. The width LG3 of the low refractive area RFL is greater than the width LG2 of the extension portion Ex2. For example, the width LG3 of the low refractive area RFL is substantially the same as the sum of the width LG2 of the extension portion Ex2 and the width WD1 of the sealing member SE1. Therefore, the low refractive area RFL can reflect light which enters the sealing member SE1. The low refractive area RFL is formed of, for example, substantially the same material as the light-shielding layer BM. Note that the low refractive area REL may be exposed in the extension portion Ex2. In this case, the low refractive area RFL may be in contact with the main surface 20A and the sealing member SE1 between the main surface 20A and the sealing member SE1. The low refractive area RFL may be disposed only in the extension portion Ex2. In other words, the low refractive area RFL is disposed from the end portion E21 to the sealing member SE1. In this case, the width LG3 of the low refractive area RFL is the same as the width LG2 of the extension portion Ex2. Other insulating layers and various other layers may be located between the transparent substrate 20 and the low refractive area RFL. In addition, other insulating layers and various other layers may be located between the low refractive area RFL and the common electrode CE.

Therefore, the display device DSP according to modification example 5 has advantages similar to those of the above-described embodiment. In addition, since the low refractive area RFL is disposed from the end portion E21 to directly above the sealing member SE1, light which enters the sealing member SE1 can also be reflected. Therefore, the display device DSP can suppress degradation in display quality.

Modification Example 7

A display device DSP of modification example 7 differs from the display devices DSP of the above-described embodiment and the above-described modification examples in the configuration of the first substrate SUB1. More specifically, the display device DSP of modification example 7 differs from the display devices DSP of the above-described embodiment and the above-described modification examples in that the first substrate SUB1 includes a transparent substrate 40 below the transparent substrate 10.

Figure 12:
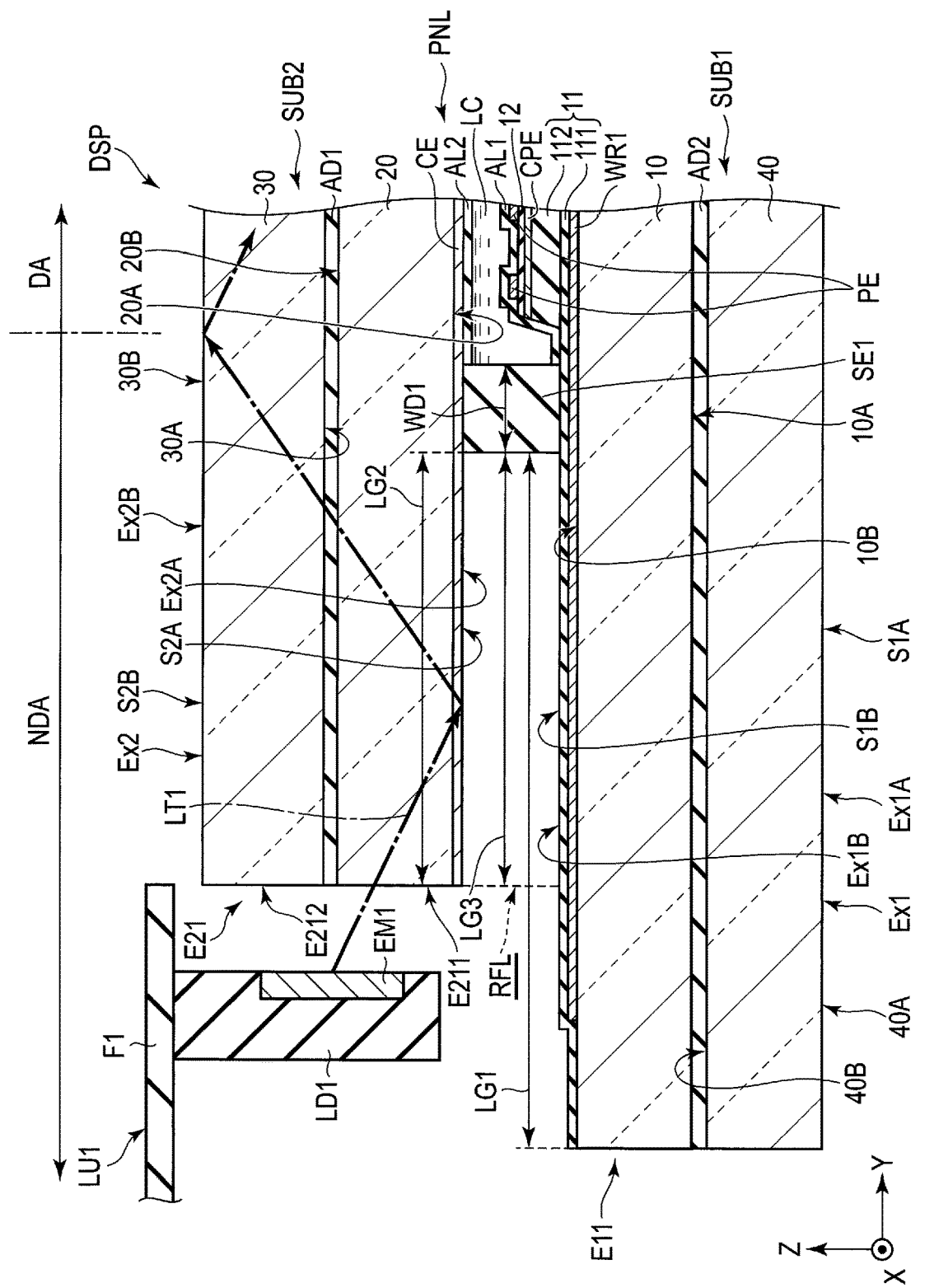
FIG. 12 is an enlarged cross-sectional view of the vicinity of an extension portion of a first substrate according to modification example 7.

FIG. 12 is an enlarged cross-sectional view of the vicinity of the extension portion Ex1 of the first substrate SUB1 according to modification example 7.

The first substrate SUB1 further includes a transparent substrate 40 and a transparent adhesive layer AD2. The transparent substrate 40 faces the transparent substrate 10 on the opposite side to the transparent substrate 20. The transparent substrate 40 has a main surface (lower surface) 40A and a counter surface (upper surface) 403 on the opposite side to the main surface 40A. The counter surface 40B faces the main surface 10A. In the example shown in FIG. 12, the main surface 40A corresponds to the main surface S1A of the first substrate SUB1. The transparent adhesive layer AD2 is located between the main surface 10A and the counter surface 40B. The transparent adhesive layer AD2 is applied to substantially the entire main surface 10A and the entire counter surface 40B and bonds the transparent substrate 10 and the transparent substrate 40 together. In other words, the transparent substrate 40 is bonded to the transparent substrate 10 via the transparent adhesive layer AD2. Note that various layers other than the transparent adhesive layer AD2 may be located between the transparent substrate 10 and the transparent substrate 40. The transparent substrate 40 is formed of, for example, the same material as the transparent substrate 30. For example, the transparent substrate 40 is formed of transparent glass or transparent resin such as poly(methyl methacrylate) (PMMA) or polycarbonate (PC).

Therefore, the display device DSP according to modification example 7 has advantages similar to those of the above-described embodiment.

Modification Example 8

A display device DSP of modification example 8 differs from the display devices DSP of the above-described embodiment and the above-described modification examples in the configuration of the second substrate SUB2. More specifically, the display device DSP of modification example 8 differs from the display devices DSP of the above-described embodiment and the above-described modification examples in that the second substrate SUB2 does not include the transparent substrate 30.

Figure 13:
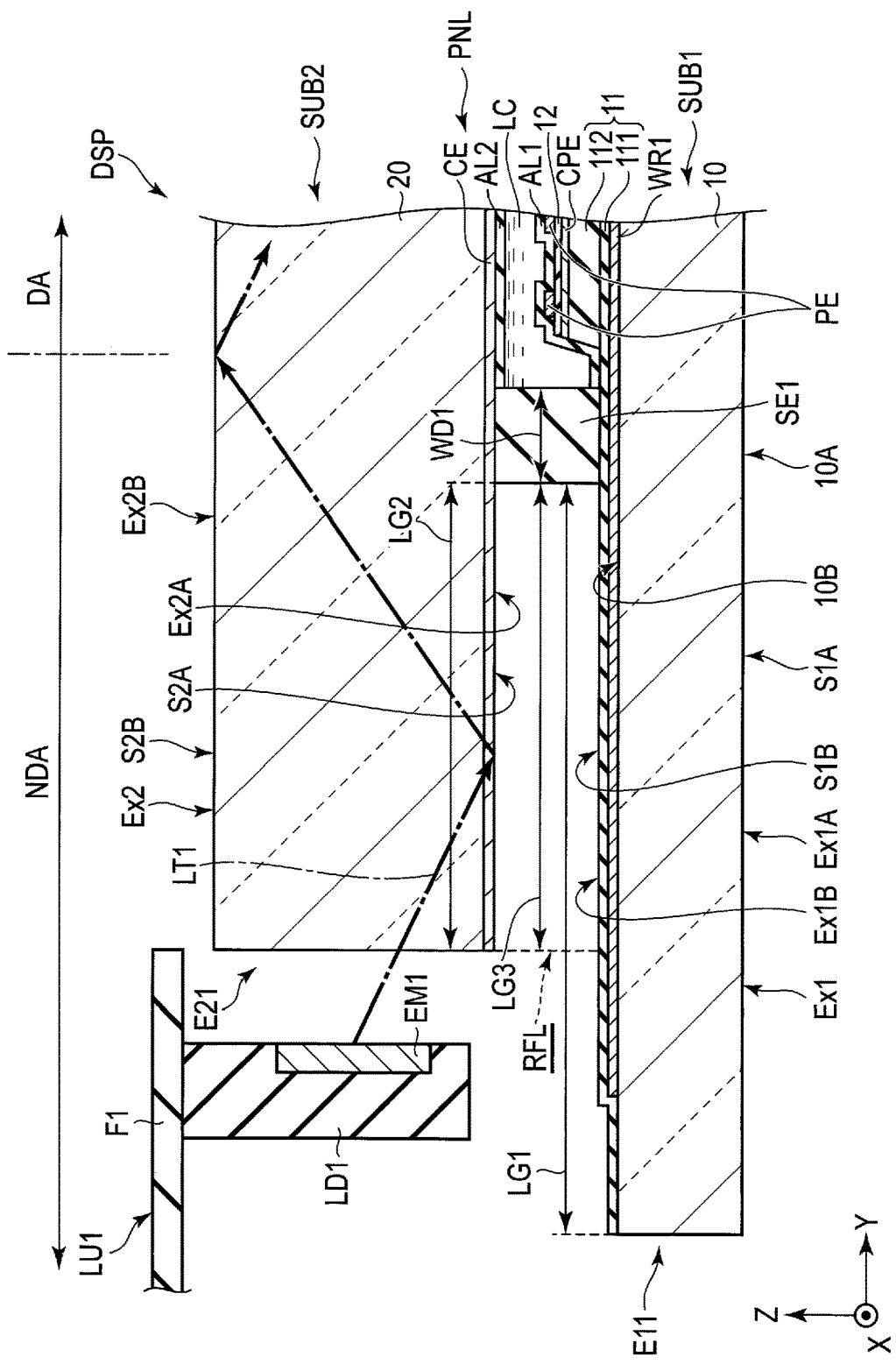
FIG. 13 is an enlarged cross-sectional view of the vicinity of an extension portion of a second substrate according to modification example 8.

FIG. 13 is an enlarged cross-sectional view of the vicinity of the extension portion Ex2 of the second substrate SUB2 according to modification example 8. Note that only main parts of the display device DSP are shown in FIG. 13.

The second substrate SUB2 includes the transparent substrate 20, the common electrode CE and the alignment film AL2. In addition, the second substrate SUB2 includes the light-shielding layer BM which is not illustrated. The counter surface 20B corresponds to the counter surface S2B of the second substrate SUB2. In addition, the end portion E211 of the transparent substrate 20 corresponds to the end portion E21 of the second substrate SUB2. Therefore, the display device DSP according to modification example 8 has advantages similar to those of the above-described embodiment.

Modification Example 9

A display device DSP of modification example 9 differs from those of the above-described embodiment and the above-described modification examples in that the light source unit LU1 includes an optical member OM1.

Figure 14:
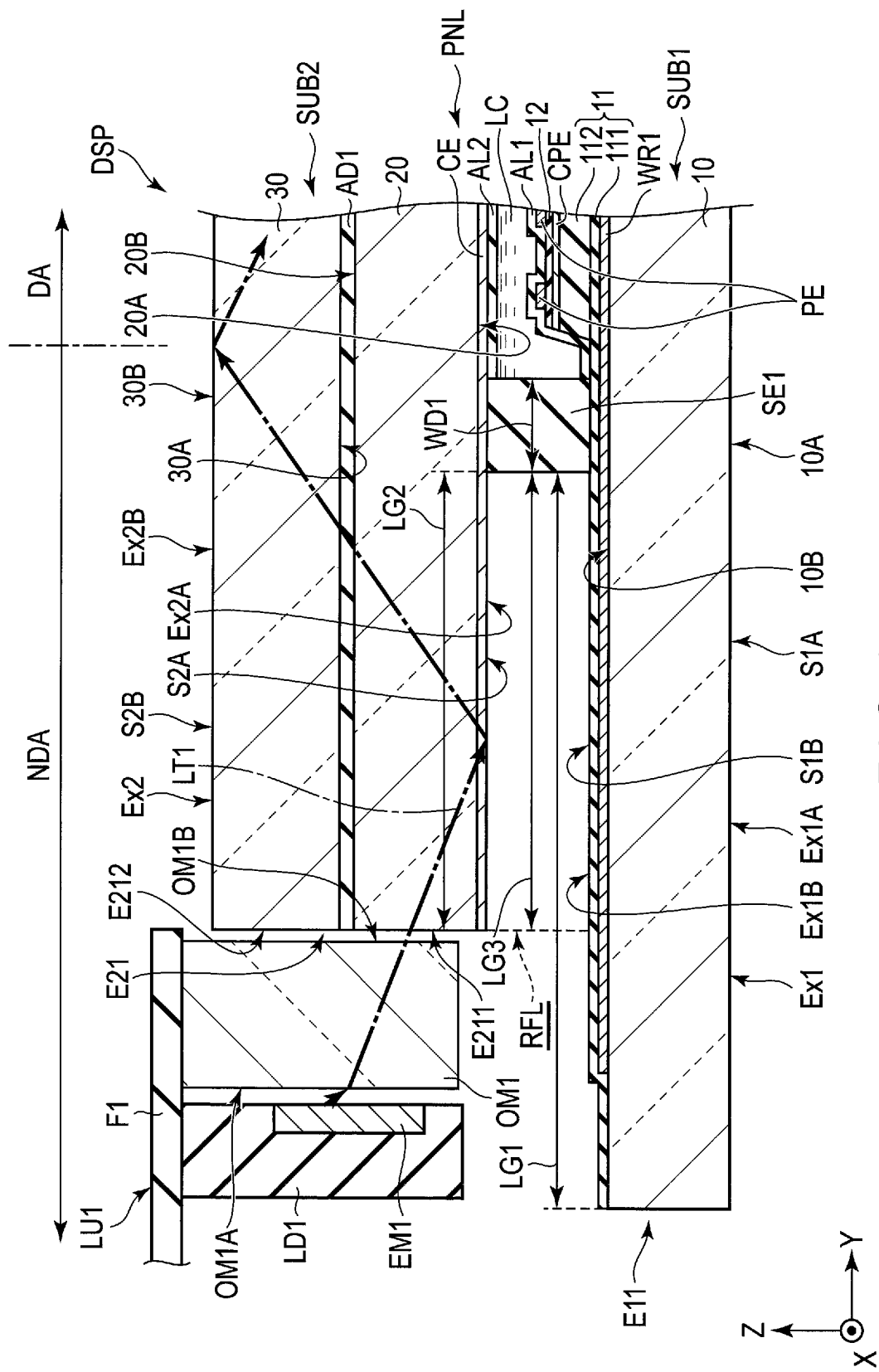
FIG. 14 is an enlarged cross-sectional view of the vicinity of an extension portion of a second substrate according to modification example 9.

FIG. 14 is an enlarged cross-sectional view of the vicinity of the extension portion Ex2 of the second substrate SUB2 according to modification example 9. Note that only main parts of the display device DSP are shown in FIG. 14.

The light source unit LU1 further includes an optical member OM1. The optical member OM1 has the shape of, for example, a rectangular parallelepiped extending in the first direction X. The optical member OM1 is located between the second substrate SUB2 (transparent substrate 20 and transparent substrate 30) and the light-emitting elements LD1. The optical member OM1 has a surface OM1A and a surface OM1B on the opposite side to the surface OM1A. The surface OM1A faces the light-emitting elements LD1, and the surface OM1B faces the end portion E21 (end portion E211 and end portion E212). The surfaces OM1A and OMG1B are flat surfaces parallel to the X-Z plane defined by the first direction X and the third direction Z. Note that the surfaces OM1A and OM1B may be uneven surfaces. In addition, the surfaces OM1A and OM1B may not be parallel to each other. The optical member OM1 is, for example, lens.

Light emitted from the light-emitting portion EM1 enters the optical member OM1 from the surface OM1A, travels through the optical member OM1 and is emitted from the surface OM1B to the end portion E21. Light emitted from the surface OM1B enters the extension portion Ex2 (second substrate SUB2) from the end portion E21.

Therefore, the display device DSP according to modification example 9 has advantages similar to those of the above-described embodiment.

Examples of the display device obtainable from the configurations described in the present specification will be additionally described below.

(1) A display device comprising:
a first substrate having a first end portion located in a non-display area around a display area where an image is displayed;
a second substrate facing the first substrate and having a second end portion separated from the first end portion toward the display area in the non-display area;
a liquid crystal layer located between the first substrate and the second substrate and containing a stripe-shaped polymer and liquid crystal molecules;
a light-emitting element facing the second end portion;
a first sealing member which is closer to the display area than the second end portion is in the non-display area and bonding the first substrate and the second substrate together; and
a low refractive area located between the first substrate and the second substrate, located between the second end portion and the first sealing member in planar view, and containing a material having a refractive index lower than that of the second substrate.

(2) The display device of (1), wherein the low refractive area is an air layer.

(3) The display device of (1), further comprising a second sealing member separated from the first sealing member toward the second end portion in the non-display area and bonding the first substrate and the second substrate together.

(4) The display device of (3), wherein the low refractive area is located between the first sealing member and the second sealing member.

(5) The display device of (4), wherein the low refractive area is a vacuum layer.

(6) The display device of (1), wherein the low refractive area is in contact with the second substrate.

(7) The display device of (6), further comprising an insulating layer facing the low refractive area,
wherein the low refractive area is located between the insulating layer and the second substrate.

(8) The display device of (1), wherein a metal member located between the second end portion and the first sealing member in planar view is formed on the second substrate, and
the metal member is located between the first substrate and the second substrate.

(9) The display device of (1), wherein a width of the low refractive area in a direction from the second end portion toward the first sealing member is greater than a width of the first sealing member in the direction.

(10) The display device of (1), further comprising a third substrate which has a third end portion overlapping the second end portion in the non-display area, the second substrate being located between the first substrate and the third substrate,
wherein the first sealing member is closer to the display area than the second end portion and the third end portion is in the non-display area and bonds the first substrate and the second substrate together, and
the low refractive area is located between the third end portion and the first sealing member in planar view.

(11) A display device comprising:
a first substrate having a first end portion located in a non-display area around a display area where an image is displayed and a second end portion located at an opposite side of the first end portion;
a second substrate facing the first substrate and having a third end portion which is separated from the first end portion toward the display area in the non-display area and a fourth end portion which is located at an opposite side of the third end portion;
a liquid crystal layer located between the first substrate and the second substrate and containing a stripe-shaped polymer and liquid crystal molecules;
a light-emitting element facing the third end portion; and
a sealing member disposed around the display area in the non-display area, being closer to the display area than the third end portion is in the non-display area, and bonding the first substrate and the second substrate together,
wherein a gap is located between the first substrate and the second substrate and between the third end portion and the sealing member in planar view, and
a first distance from the third end portion to the sealing member is greater than a second distance from the fourth end portion to the sealing member.

(12) The display device of (11), wherein a low refractive area containing a material having a refractive index lower than that of the second substrate is located in at least part of the gap.

(13) The display device of (11), wherein a metal member is located in at least part of the gap in a state where the metal member is in contact with the second substrate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate having a first end portion located in a non-display area around a display area where an image is displayed;
   a second substrate facing the first substrate and having a second end portion separated from the first end portion toward the display area in the non-display area;
   a third substrate facing the second substrate and having a third end portion overlapping the second end portion in the non-display area;
   a liquid crystal layer located between the first substrate and the second substrate and containing a stripe-shaped polymer and liquid crystal molecules;
   a light-emitting element facing the second end portion and the third end portion; and
   a first sealing member which is closer to the display area than the second end portion is in the non-display area and bonds the first substrate and the second substrate together, wherein
   the second substrate is located between the first substrate and the third substrate,
   the first sealing member is closer to the display area than the second end portion and the third end portion are in the non-display area and bonds the first substrate and the second substrate together,
   at least one of a metal member and an inorganic insulating film is located on a first area between the second end portion and the first sealing member in planar view, and does not overlap the first sealing member in the planar view, and
   the first area is a low refractive area and a width of the area in a direction from the second end portion toward the first sealing member is five times or more a width of first sealing member in the direction.

2. The display device of claim 1, wherein the low refractive area is an air layer.

3. The display device of claim 1, further comprising a second sealing member separated from the first sealing member toward the second end portion in the non-display area and bonding the first substrate and the second substrate together.

4. The display device of claim 3, wherein the low refractive area is located between the first sealing member and the second sealing member.

5. The display device of claim 1, wherein the at least one of the metal member and the inorganic film in contact with the second substrate.

* * * * *